June 2, 1953 — H. J. REEDER — 2,640,596
UTILITY HOLDER FOR AUTOMOBILES
Filed Jan. 19, 1950

INVENTOR
Harry J. Reeder
By Walter P. Guyer
ATTORNEY

Patented June 2, 1953

2,640,596

UNITED STATES PATENT OFFICE 2,640,596

UTILITY HOLDER FOR AUTOMOBILES

Harry J. Reeder, Buffalo, N. Y.

Application January 19, 1950, Serial No. 139,389

4 Claims. (Cl. 211—87)

1

This invention relates to certain new and useful improvements in a utility holder adapted for use on motor vehicles and the like.

It has for one of its objects to provide a holder of this character which is so designed and constructed as to conveniently receive and effectively retain various and sundry items neatly in place and as readily permit their removal for use when desired.

Another object of the invention is to provide a utility holder which is simple, compact and neat in construction for attachment to the dashboard or like portion of an automobile, and which embodies in an integral unit means for receiving a package of cigarettes, a match packet, a pencil, and a note book, mail matter or the like.

Other features of the invention reside in the construction and arrangement of parts hereinafter described and particularly pointed out in the appended claims.

Figure 1:
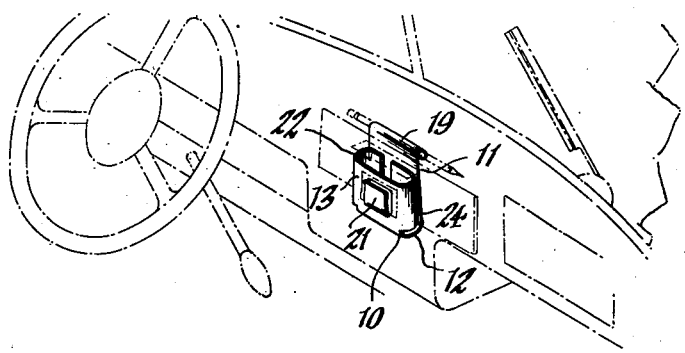
Figure 2:
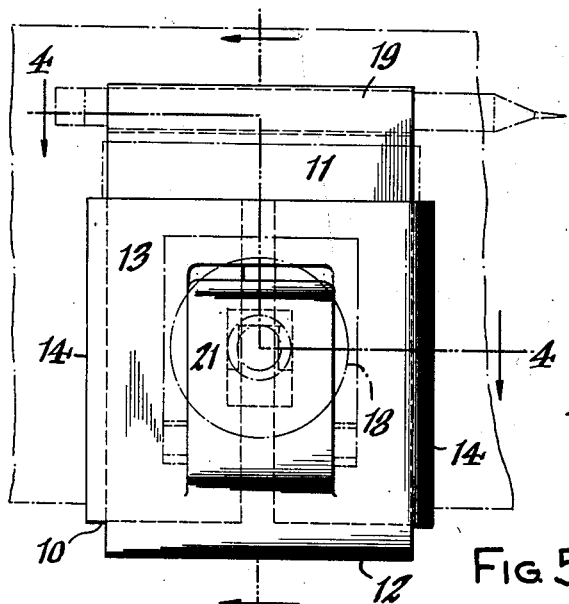
Figure 3:
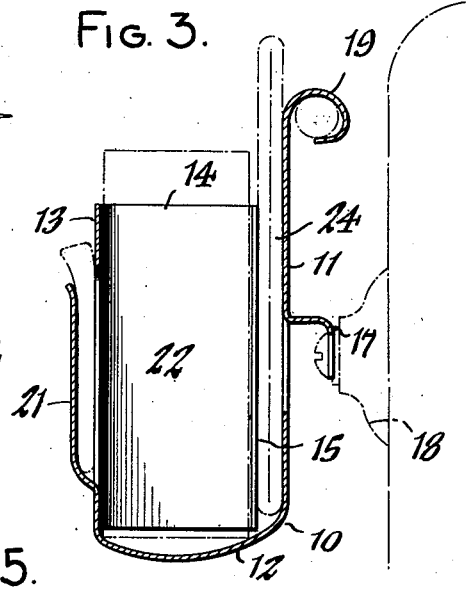
Figure 4:
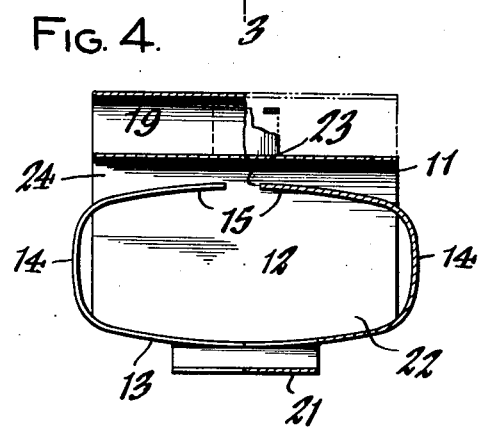
Figure 5:
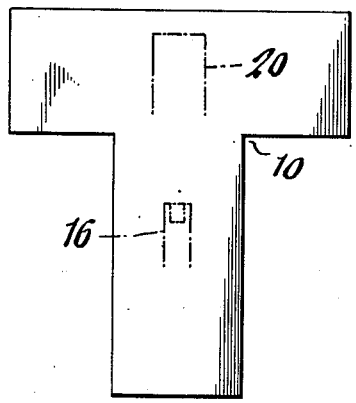

In the accompanying drawings:

Figure 1 is a perspective view of my improved utility holder mounted in position on the dashboard of an automobile. Figure 2 is an enlarged front view thereof. Figure 3 is a vertical section taken on line 3—3, Figure 2. Figure 4 is a horizontal section taken in the plane of line 4—4, Figure 2. Figure 5 is a plan view of the stamped blank from which the holder is formed.

Similar characters of reference indicate corresponding parts throughout the several views.

In the preferred embodiment of the invention shown in the drawings, it consists generally of a U-shaped body 10 stamped from a single piece of sheet metal, of substantially T-shape, to provide a rear attaching wall 11, a bottom wall 12, a front wall 13, side walls 14, and an auxiliary rear wall 15 spaced forwardly from the adjoining attaching wall. Formed from a U-shaped slit 16 in the rear attaching wall 11 is a rearwardly-offset lug 17 for conveniently attaching the holder to a vacuum cup 18 or like fastening onto the vehicle dashboard or other convenient location. At its upper end this rear wall is rolled to provide a tube-like gripping member 19 to receive a pencil or like instrument. The front wall 13 has a U-shaped slit 20 therein to provide a forwardly-offset yieldable retaining plate 21 between which and such wall a packet of matches or the like is adapted to be effectually retained.

The attaching rear and bottom walls 11 and 12, respectively, are formed in the upright portion of the T-shaped blank, while the front wall 13, side walls 14, and auxiliary rear wall 15 are

2 formed in the transverse portion of such blank and jointly provide an upwardly-opening compartment 22 to receive a package of cigarettes or the like. The auxiliary rear wall is formed from the end portions of the transverse portion of the T-shaped blank and is divided, as indicated at 23, to provide flexible sections to accommodate the compartment to variations in the dimensions of the package to be received therein and to yieldingly retain it in place. It will be further noted that this split or divided wall 15 is spaced forwardly from the attaching wall 11 to provide a receiving space 24 for receiving a note book, road map, mail matter and the like. Because of the structural arrangement of these parts of the holder, the walls defining the package compartment 22 are free to flex or yield as a unit about the bottom wall 12 and to permit the expansion and contraction of the adjoining space 24 to a variable width to effectually retain a minimum or maximum amount of matter therein.

While manifestly simple, compact and neat in appearance, this utility holder, because of its particular design in accommodating for ready access a plurality of sundry items, serves a particular need and convenience to the motorist and retains the items effectually in place against accidental displacement.

I claim as my invention:

1. A utility holder, comprising a single sheet of material of substantially T-shape in plan bent upon itself along its upright portion to provide a generally U-shaped body having rear, bottom and front walls and bent upon its transverse portion toward said rear wall for defining in side by side relation over said bottom wall an upwardly-opening compartment for receiving a package-like item and an upwardly and sidewise-opening receiving space for receiving other items.

2. A utility holder, comprising a single sheet of material of substantially T-shape in plan bent upon itself along its upright portion into substantially U-shape to define a rear attaching wall and a front wall and bent upon itself along its transverse portion toward said rear wall to define side walls and rear walls forming an upwardly-opening compartment, said rear walls being spaced forwardly from said attaching wall to define therewith an adjoining upwardly and sidewise-opening receiving space.

3. A utility holder, comprising a single sheet of material of substantially T-shape bent upon itself both vertically and transversely to define a rear attaching wall and an upwardly-opening, package-receiving compartment spaced forwardly from said wall, said compartment including a bottom wall, a front wall, side walls extending toward said attaching wall and a vertically-divided rear wall, the latter being in spaced parallel relation to the attaching wall to define therewith an upwardly and sidewise-opening expansible receiving space.

4. A utility holder, comprising a substantially U-shaped body providing a rear attaching wall, a bottom wall and a front wall, the front wall having extensions bent rearwardly and inwardly to define side and rear walls providing an upwardly-opening package receiving compartment above said bottom wall, the rear wall of said compartment being spaced from said rear attaching wall and forming therewith an upwardly and sidewise-opening receiving space.

HARRY J. REEDER.

References Cited in the file of this patent
UNITED STATES PATENTS

| Number | Name | Date |
| --- | --- | --- |
| D. 65,357 | Strnad | July 29, 1924 |
| 320,938 | Knowlton | June 30, 1885 |
| 436,600 | Hartman | Sept. 16, 1890 |
| 1,447,600 | Olevin | Mar. 6, 1923 |
| 1,560,493 | Steinberg | Nov. 3, 1925 |
| 1,720,309 | Wakefield | July 9, 1929 |
| 1,812,850 | Axell | July 7, 1931 |
| 1,982,855 | Brunner et al. | Dec. 4, 1934 |
| 2,369,364 | Mayer | Feb. 13, 1945 |